US006442399B1

(12) United States Patent
Tsuru et al.

(10) Patent No.: US 6,442,399 B1
(45) **Date of Patent: *Aug. 27, 2002**

(54) MOBILE COMMUNICATION APPARATUS

(75) Inventors: Teruhisa Tsuru, Kameoka; Harufumi Mandai, Takatsuki; Koji Shiroki; Kenji Asakura, both of Shiga-ken; Seiji Kanba, Otsu, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/506,474

(22) Filed: Feb. 17, 2000

Related U.S. Application Data

(63) Continuation-in-part of application No. 08/917,059, filed on Aug. 22, 1997, now abandoned, and a continuation-in-part of application No. 08/693,447, filed on Aug. 7, 1996, now Pat. No. 6,052,096.

(30) Foreign Application Priority Data

Aug. 7, 1995 (JP) .......................................... 7-201153
Aug. 23, 1996 (JP) .......................................... 8-222090

(51) Int. Cl.[7] .......................................... H04B 1/38
(52) U.S. Cl. ..................... 455/550; 455/90; 343/702; 343/787
(58) Field of Search ..................... 455/90, 575, 129, 455/550; 343/895, 873, 700 MS, 787, 788, 702

(56) References Cited

U.S. PATENT DOCUMENTS 5,337,061 A * 8/1994 Pye et al. .................. 455/575
5,530,919 A * 6/1996 Tsuru et al. .................. 455/90
5,797,084 A * 8/1998 Tsuru et al. .................. 455/90
6,052,096 A * 4/2000 Tsuru et al. ................ 343/787

FOREIGN PATENT DOCUMENTS

| | | |
|---|---|---|
| JP | 5868704 | 5/1983 |
| JP | 62123805 | 6/1987 |
| JP | 1198121 | 8/1989 |
| JP | 4-106909 | 4/1992 |
| JP | 6-112655 | 4/1994 |
| JP | 6338816 | 12/1994 |
| JP | 7-86819 | 3/1995 |
| JP | 7273685 | 10/1995 |

OTHER PUBLICATIONS

Office Action issued by the Japanese Patent Office on Apr. 25, 2000 in the corresponding Japanese application along with an English translation thereof.

* cited by examiner

*Primary Examiner*—Doris H. To
(74) *Attorney, Agent, or Firm*—Ostrolenk, Faber, Gerb & Soffen, LLP

(57) ABSTRACT

A portable telephone includes a portable telephone body made from plastic having a receiver, a transmitter, and dial keys, and a chip antenna which is mounted on a circuit board secured at the inside of the portable telephone body and which is electrically connected to an RF section provided on the circuit board in the portable telephone. The chip antenna is disposed near the transmitter at a location where a transmitted electromagnetic signal is unlikely to be affected by the body of a person who is holding the portable telephone.

11 Claims, 6 Drawing Sheets

MOBILE COMMUNICATION APPARATUS

CROSS REFERENCE TO RELATED APPLICATIONS

This application is a continuation-in-part of U.S. Ser. No. 08/693,447, filed Aug. 7, 1996 now U.S. Pat. No. 6,052,096 entitled "CHIP ANTENNA" and U.S. Ser. No. 08/917,059, now abandoned filed Aug. 22, 1997 entitled "MOBILE COMMUNICATION APPARATUS", the entire respective disclosures of which are incorporated by reference herein.

BACKGROUND OF THE INVENTION

1. Field of the Invention

The present invention relates to a mobile communication apparatus including a chip antenna for use in mobile communication or in a local area network (LAN).

2. Description of the Related Art

In a portable telephone 50, which is an example of a conventional mobile communication apparatus, as shown in FIGS. 10 and 11, a nondirectional whip antenna 51 is protrusively mounted at the upper part of a portable telephone body 52 and an electromagnetic signal is transmitted or received with the use of this whip antenna 51.

In the portable telephone, however, since the whip antenna is nondirectional, a transmitted electromagnetic signal is affected by the body of the person who is holding the portable telephone during use and therefore the antenna characteristics deteriorate. Especially in a high-power portable telephone, the user's body greatly affects its antenna characteristics.

To reduce these effects, the whip antenna can be mounted, for example, at the lower part of the portable telephone body; however, since the whip antenna protrudes near the mouth of the person, the antenna may be an obstacle during communication.

SUMMARY OF THE INVENTION

The present invention is made to solve such problems. Accordingly, it is a feature of the present invention to provide a mobile communication apparatus which prevents transmitted electromagnetic signals from be affected by the body of a person who is holding the apparatus and which is configured such that its antenna is not an obstacle during communication.

This feature of the present invention may be achieved through the provision of a mobile communication apparatus including a chip antenna provided with: a base member made from at least one of a dielectric material and a magnetic material, at least one conductor formed at least at one of the inside and a surface of the base member, and at least one electromagnetic signal supply terminal provided on a surface of the base member in order to apply an electromagnetic signal voltage to the conductor; and an apparatus body for accommodating the chip antenna within its interior, wherein the chip antenna is disposed at a place in the apparatus body where an electromagnetic signal for transmission or reception is not significantly adversely affected.

According to the mobile communication apparatus described above, an electromagnetic signal for transmission or reception is prevented from being adversely affected by disposing the chip antenna at a position in the portable telephone body where the electromagnetic signal is unlikely to be affected by the body of a person who is using the mobile communication apparatus. Therefore, the deterioration of the antenna characteristics during transmission and reception caused by these effects can be reduced.

Since the chip antenna is disposed inside the portable telephone body, the antenna is not an obstacle during communication.

In the mobile communication apparatus, the chip antenna may be disposed at a place which is positioned at the lower part of the apparatus body during use.

According to the mobile communication apparatus described above, since the chip antenna is disposed at a portion located at the lower part of the body during use, the deterioration of the antenna characteristics during transmission and reception caused by the body of the person who is using the telephone can be further reduced.

According to a mobile communication apparatus of the present invention, a transmitted electromagnetic signal can be prevented from being adversely affected by disposing the chip antenna at a place in the body where the transmitted electromagnetic signal is unlikely to be affected by the body of a person who is holding the apparatus.

DESCRIPTION OF EMBODIMENTS OF THE INVENTION

Figure 1:
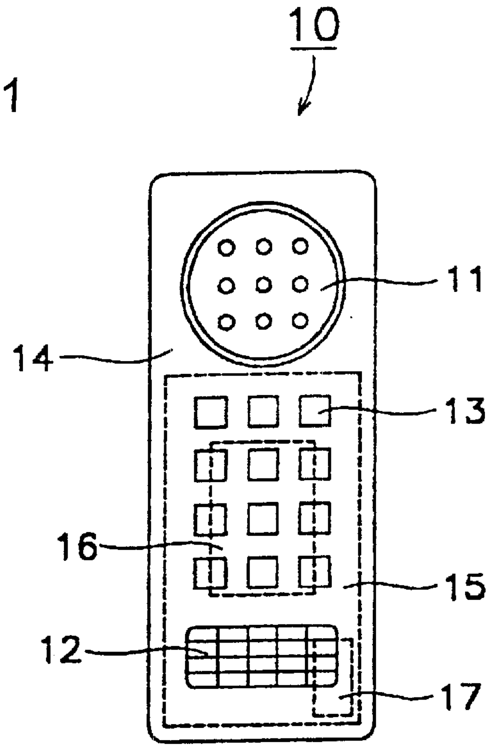
FIG. 1 is an elevation of a portable telephone, partially in phantom, which is an example of a mobile communication apparatus according to a first embodiment of the present invention.

Embodiments of a mobile communication apparatus according to the present invention will be described below by referring to the drawings.

Figure 2:
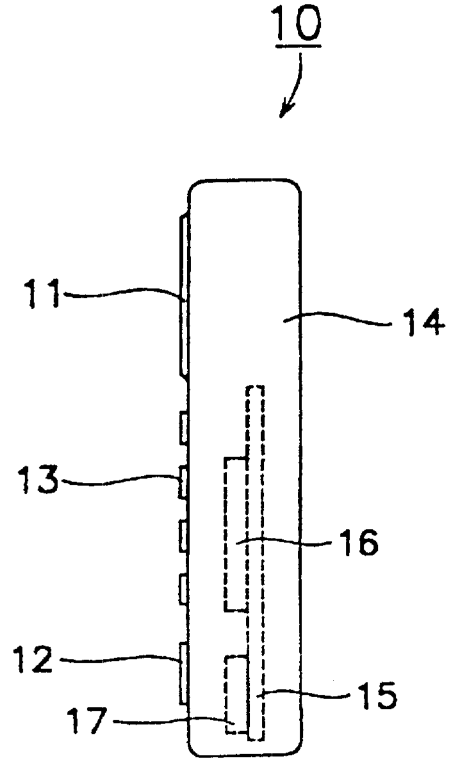
FIG. 2 is a side view of the mobile communication apparatus shown in FIG. 1.

FIG. 1 and FIG. 2 are a partially transparent elevation and a partially transparent side view of a mobile communication apparatus according to a first embodiment of the present invention. In FIGS. 1 and 2, a portable telephone 10 includes a portable telephone body 14 made from, for example, plastic having a receiver 11, a transmitter 12, and dial keys 13, and a chip antenna 17 which is mounted on a circuit board 15 secured at the inside of the portable telephone body 14 and which is electrically connected to an RF section 16 provided on the circuit board 15 in the portable telephone 10 with a transmission line (not shown) on the circuit board 15. The chip antenna 17 is disposed at a place where a transmitted electromagnetic signal is unlikely to be affected by the body of a person who is holding the portable telephone 10, for example, near the transmitter 12.

Even when the chip antenna 17 is of a nondirectional type, in the portable telephone 10 configured as described above, since the emission path of an electromagnetic signal transmitted from the chip antenna 17 is away from a person who is holding the portable telephone 10, the transmitted electromagnetic signal is unlikely to be affected by the body of the person and the antenna characteristics of the chip antenna 17 are prevented from deteriorating.

Figure 3:
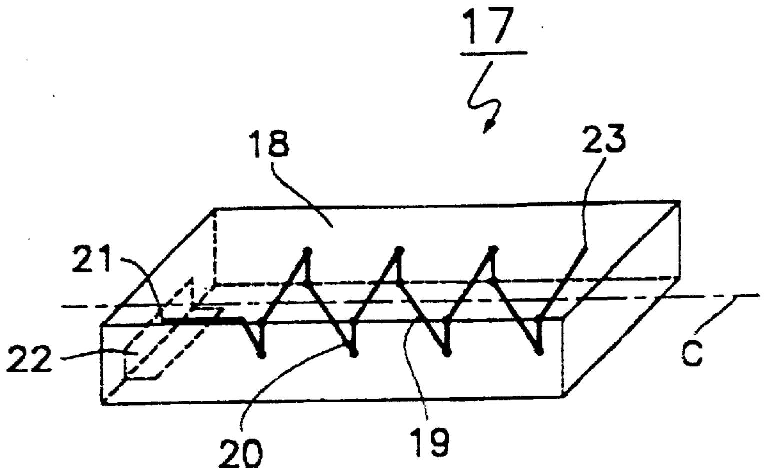
FIG. 3 is a perspective view of a chip antenna which can be used in a mobile communication apparatus of the present invention.
Figure 4:
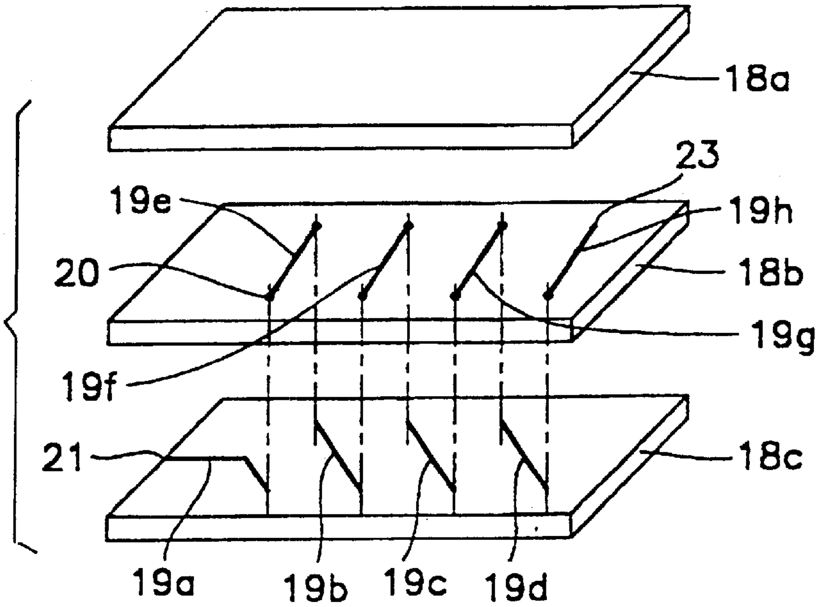
FIG. 4 is an exploded perspective view of the chip antenna shown in FIG. 3.

The chip antenna 17 is formed, for example, by a conductor 19 helically wound in the longitudinal direction of a rectangular-parallelepiped base member 18 and disposed in the inside of the member 18, as shown in FIG. 3 and FIG. 4. The base member 18 is made from laminated rectangular sheet layers 18*a* to 18*c* which are made from a dielectric material having barium oxide, aluminum oxide, and silica as main components. Among these layers, on surfaces of the sheet layers 18*b* and 18*c*, straight or almost L-shaped electrically conductive patterns 19*a* to 19*h* made from copper or a copper alloy are formed by printing, deposition, bonding, or plating. Via holes 20 are also provided for the sheet layer 18*b* in the thickness direction. By laminating the sheet layers 18*a* to 18*c* and connecting the electrically conductive patterns 19*a* to 19*h* with the via holes 20, winding cross sections perpendicular to a winding axis C become rectangles and the helically wound conductor 19 is formed.

One end of the conductor 19 (one end of the electrically conductive pattern 19*a*) is led to a surface of the base member 18 to form an electromagnetic signal supply section 21 and is connected to an electromagnetic signal supply terminal 22 provided on a surface of the base member 18 in order to apply an electromagnetic signal to the conductor 19. The other end of the conductor 19 (one end of the electrically conductive pattern 19*h*) forms a free end 23 inside the base member 18.

Figure 5:
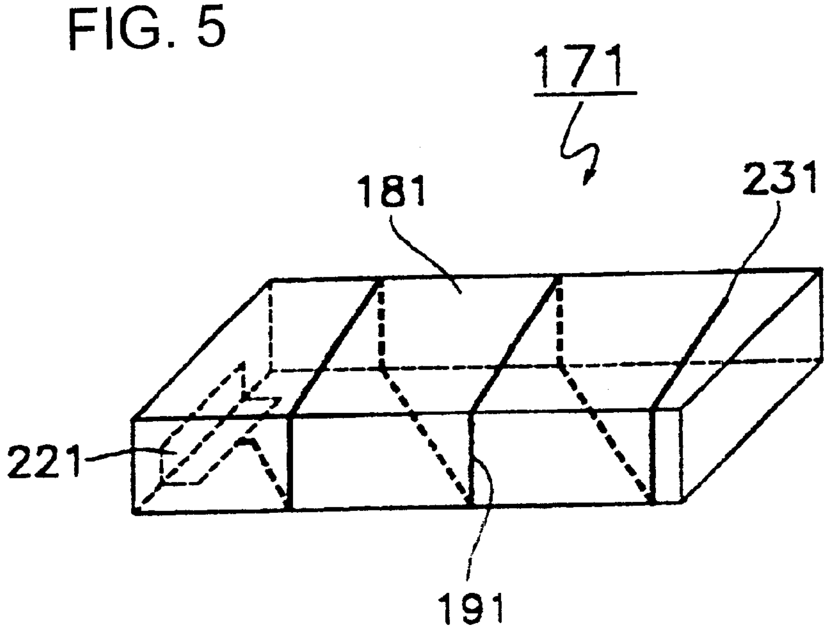
FIG. 5 is a transparent perspective view of a modification of the chip antenna shown in FIG. 3.
Figure 6:
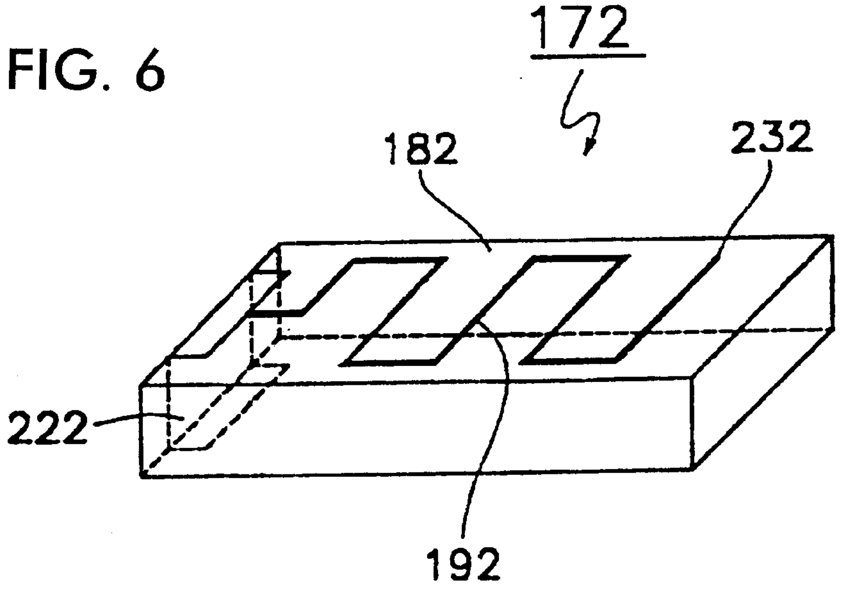
FIG. 6 is a transparent perspective view of another modification of the chip antenna shown in FIG. 3.

FIG. 5 and FIG. 6 are transparent perspective views of a modification of the chip antenna 17 shown in FIG. 3. A chip antenna 171 shown in FIG. 5 includes a rectangular-parallelepiped base member 181, and a conductor 191 helically wound in the longitudinal direction of the base member 181 along surfaces of the base member 181, and an electromagnetic signal supply terminal 221 used for applying an electromagnetic signal to the conductor 191 and provided on surfaces of the base member 181. One end of the conductor 191 is connected to the electromagnetic signal supply terminal 221 on a surface of the base member 181. The other end of the conductor 191 forms a free end 231 on a surface of the base member 181. In this case, since the conductor can be easily formed helically on surfaces of the base member by printing or other methods, the manufacturing process of the antenna can be simplified.

A chip antenna 172 shown in FIG. 6 includes a rectangular-parallelepiped base member 182, a conductor 192 formed in a meandering shape on a surface of the base member 182, and an electromagnetic signal supply terminal 222 used for applying an electromagnetic signal to the conductor 192. One end of the conductor 192 is connected to the electromagnetic signal supply terminal 222 on a surface of the base member 182. The other end of the conductor 192 forms a free end 232 on a surface of the base member 182. In this case, since the meandering-shaped conductor is formed only on one main surface of the base member, the base member can be made with a low profile, and thereby the chip antenna can also be made with a low profile. The meandering-shaped conductor may also be formed inside the base member.

Figure 7:
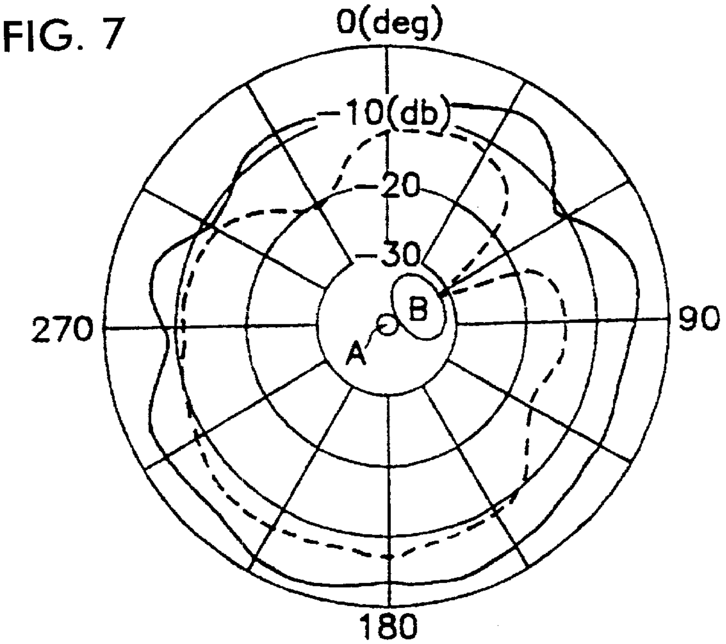
FIG. 7 is a chart indicating the antenna gain of the mobile communication apparatus shown in FIG. 1.

An antenna gain in a case when the chip antenna 17 is disposed near the transmission section 12 in the portable telephone body 14 as shown in FIG. 1 is compared with an antenna gain in a case when the whip antenna 50 is protrusively mounted at the upper section of the portable telephone 51. FIG. 7 shows a comparison result. In FIG. 7, a solid line indicates an antenna gain in the present embodiment, and a dotted line indicates an antenna gain in the conventional case. Point A indicates the position of the portable telephones 10 and 50, and point B indicates the position of a person who is holding the telephones.

It is understood from the result in FIG. 7 that, in the portable telephone according to the present embodiment, the antenna gain is substantially constant in the range of 0 degrees to 360 degrees and the person who is holding the telephone does not affect the antenna gain.

In contrast, the antenna gain of the conventional portable telephone greatly decreases near a person who is holding the telephone. This indicates that a transmitted electromagnetic signal is affected by the body of the person.

As described above, in the first embodiment, a transmitted electromagnetic signal is prevented from being adversely affected by disposing the chip antenna near the transmission section at the lower section of the portable telephone, which is a position in the portable telephone where a transmitted electromagnetic signal is unlikely to be affected by the body of a person who is holding the telephone. Therefore, the deterioration of the antenna characteristics caused by the body of a person who is holding the telephone during transmission and receiving can be reduced.

Since the chip antenna is disposed inside the portable telephone body, the antenna is not an obstacle during communication.

Figure 8:
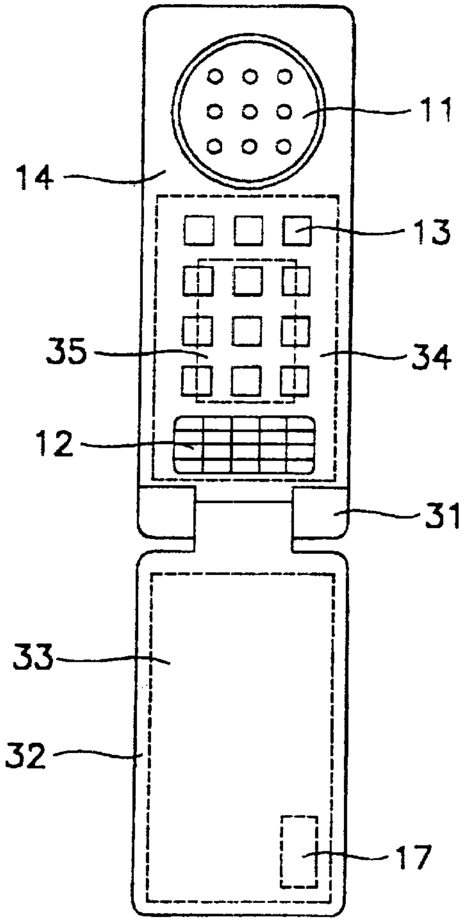
FIG. 8 is an elevation of a portable telephone, partially in phantom, which is an example of a mobile communication apparatus according to a second embodiment of the present invention.
Figure 9:
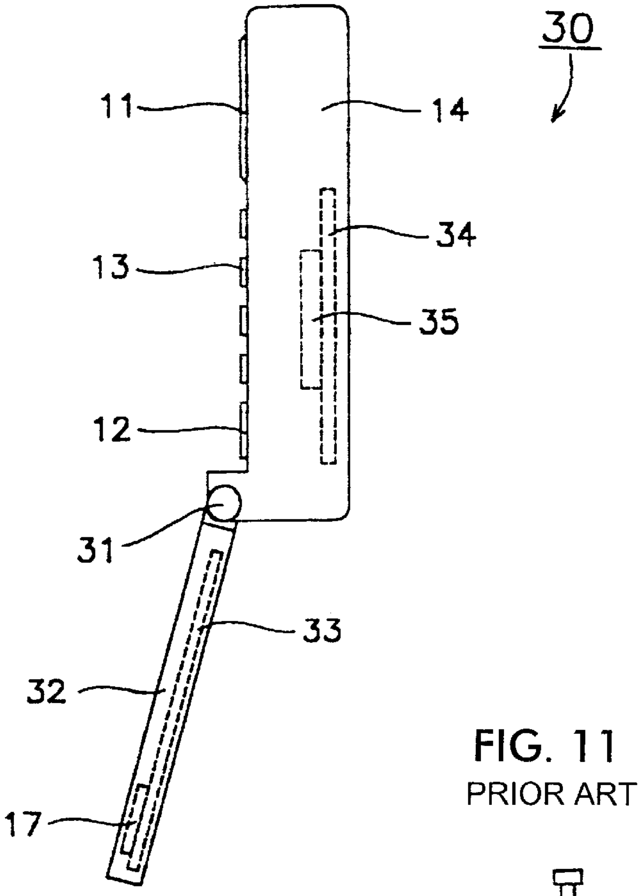
FIG. 9 is a side view of the mobile communication apparatus shown in FIG. 8.
Figure 10:
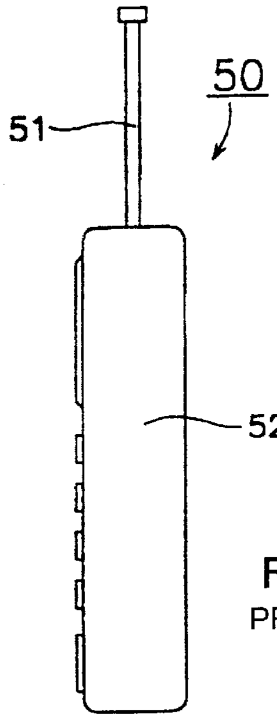
FIG. 10 PRIOR ART
FIG. 10 is an elevation of a conventional mobile communication apparatus.
Figure 11:
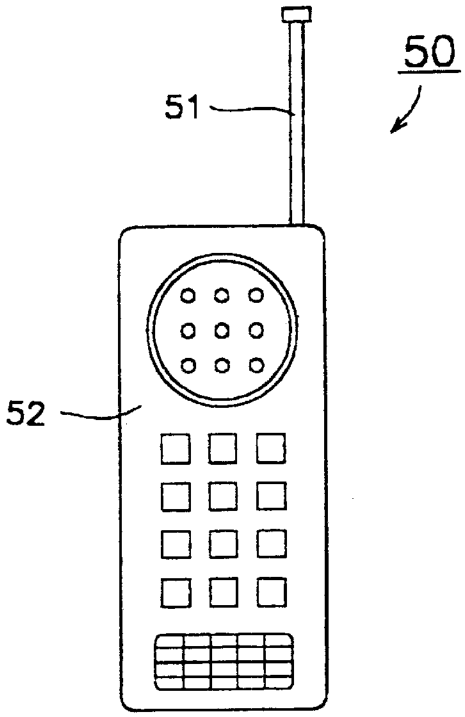
FIG. 11 PRIOR ART
FIG. 11 is a side view of the mobile communication apparatus shown in FIG. 10.

FIG. 8 and FIG. 9 are a partially transparent elevation and a partially transparent side view of a mobile communication apparatus according to a second embodiment of the present invention. In FIGS. 8 and 9, a portable telephone 30 is equipped with a cover 32 rotatably connected to the lower part of a portable telephone body 14 by a hinge section 31. With the cover 32 being opened, dial keys 13 are pressed to use the portable telephone 30.

A chip antenna 17 mounted on a circuit board 33 is disposed at a tip of the cover 32. This chip antenna 17 is electrically connected with a lead (not shown) to the RF section 35 of the portable telephone 30 provided on a circuit board 34 secured to the inside of the portable telephone body 14. At the tip of the cover 32, a transmitted electromagnetic signal is unlikely to be affected by the body of a person who is holding the telephone.

As described above, in the second embodiment, by disposing the chip antenna at the tip of the cover in the portable telephone, where a transmitted electromagnetic signal is unlikely to be affected by the body of a person who is holding the telephone, the distance between the person who is holding the telephone and the chip antenna can be increased during transmission and reception. Therefore, in addition to the advantages of the first embodiment, the deterioration of the antenna characteristics during transmission and reception caused by the body of the person who is holding the telephone can be further reduced.

In the first and second embodiments, the base member of the chip antenna is made from a dielectric material. The material of the base member is not limited to a dielectric material and may be a magnetic material such as ferrite, or a combination of a dielectric material and a magnetic material.

In the above embodiments, a single conductor is used. A plurality of conductors disposed in parallel to each other may also be used. In this case, a plurality of resonant frequencies can be provided according to the number of conductors, and one antenna can handle multiple bands.

In the above embodiments, the conductor is formed inside the base member of the chip antenna or on a surface of the base member. Also, conductive patterns may be wound both on a surface and in the inside of the base member to form the conductor.

Figure 12:
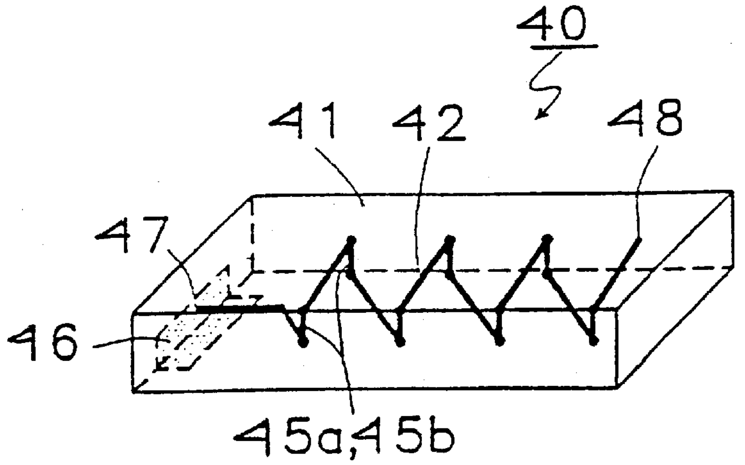
FIG. 12 is an isometric view illustrating an embodiment of another chip antenna which can be used in a mobile communication apparatus of the present invention.
Figure 13:
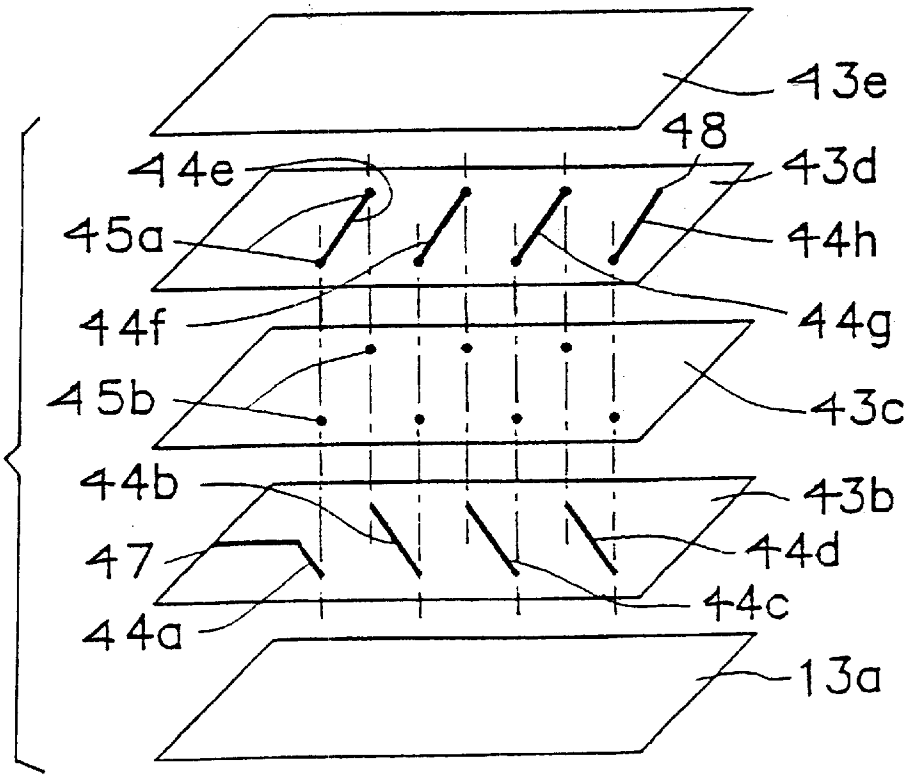
FIG. 13 is an exploded isometric view of FIG. 12.

FIGS. 12 and 13 are an isometric view and an exploded isometric view illustrating an embodiment of a chip antenna 40, which may be used advantageously in the mobile communication apparatus of the present invention in lieu of the chip antenna 17.

The chip antenna 40, which is the same as the chip antenna described in U.S. Ser. No. 08/693,447, comprises a conductor 42 which is spiralled along the longitudinal direction in a rectangular dielectric base member 41. The dielectric base member is formed by laminating rectangular sheets 43*a*–43*e*, each having a dielectric constant of 2 to 130, or having a relative permeability of 2 to 7, as shown in Tables 1 and 2.

TABLE 1

| No. | Composition | Dielectric Constant | Q · f |
|---|---|---|---|
| 1 | Bi—Pb—Ba—Sm—Ti—O | 130 | 1,000 |
| 2 | Bi—Pb—Ba—Nd—Ti—O | 110 | 2,500 |
| 3 | Pb—Ba—Nd—Ti—O | 90 | 5,000 |
| 4 | Ba—Nd—Ti—O | 60 | 4,000 |
| 5 | Nd—Ti—O | 37 | 8,000 |
| 6 | Mg—Ca—Ti—O | 21 | 20,000 |
| 7 | Mg—Si—O | 10 | 80,000 |
| 8 | Bi—Al—Si—O | 6 | 2,000 |
| 9 | (Ba—Al—Si—O) + Teflon ® Polytetrafluoroethylene Resin | 4 | 4,000 |
| 10 | Teflon ® Polytetrafluoroethylene Resin | 2 | 10,000 |

TABLE 2

| No. | Composition | Relative Permeability | Threshold Frequency |
|---|---|---|---|
| 11 | Ni/Co/Fe/O = 0.49/0.04/0.94/4.00 | 7 | 130 MHZ |
| 12 | Ni/Co/Fe/0 + 0.47/0.06/0.94/4.00 | 5 | 360 MHZ |
| 13 | Ni/Co/Fe/0 + 0.45/0.08/0.94/4.00 | 4 | 410 MHZ |
| 14 | (Ni/Co/Fe/0 + 0.45/0.08/0.94/4.00 + Teflon | 2 | 900 MHZ |

The Q·f in Table 1 represents the product of the Q value and a measuring frequency and is a function of the material. The threshold frequency in Table 2 represents the frequency that the Q value is reduced by half to an almost constant Q value at a low frequency region, and represents the upper limit of the frequency applicable to the material.

At the surface of the sheet layers 43*b* and 43*d* of the sheet layers 43*a* through 43*e*, each of which has a dielectric constant $\epsilon$ of $1<\epsilon<130$ or a relative permeability $\mu$ of $1<\mu<7$, linear conductive patterns 44*a* through 44*h* comprising a metal mainly containing Cu, Ni, Ag, Pd, Pt or Au are provided by printing, evaporating, laminating or plating, as shown in Table 3. In the sheet layer 43*d*, a via hole 45*a* is formed at both ends of the conductive patterns 44*e* through 44*g* and one end of the conductive pattern 44*h*. Further, in the sheet layer 43*c*, a via hole 45*b* is provided at the position corresponding to the via hole 45*a*, in other words, at one end of the conductive pattern 44*a* and at both ends of the conductive patterns 44*b* through 44*d*. A spiral conductor 42 having a rectangular cross-section is formed by laminating the sheet layers 43*a* through 43*e* so that the conductive patterns 44*a* through 44*h* come in contact with via holes 45*a*, 45*b*. In material Nos. 1 to 8 and Nos. 11 to 13, the chip antenna 40 is made by monolithically sintering the base member 41 and the conductive patterns 14*a* through 14*h* under the conditions shown in Table 3. On the other hand, such a sintering process is not employed in material Nos. 9, 10 and 14 each containing a resin.

TABLE 3

| Metal | Material No. | Sintering Atmosphere | Sintering Temperature |
|---|---|---|---|
| Cu | 8 | Reductive | ≦1,000° C. |
| Ni | 7 | Reductive | 1,000 to 1,200° C. |
| Ag—Pd alloy | 1,2,3,4,5,11,12 | Air | 1,000 to 1,250° C. |
| Pt | 6 | Air | ≦1,250° C. |
| Ag | 9,11,14 | Not Sintered | |

Each material No. in Table 3 is identical to that in Tables 1 and 2.

One end of the conductor 42, i.e., the other end of the conductive pattern 44*a*, is brought to the surface of the dielectric base member 41 to form a feeding end 47 which connects to a feeding terminal 46 for applying a voltage to the conductor 42, and the other end, i.e., the other end of the conductive pattern 44*h*, forms a free end 48 in the dielectric base member 41.

Table 4 shows relative bandwidth at the resonance point of the chip antenna 40 when using various materials as the sheet layers 43*a* through 43*e* comprising the base member 41. The relative bandwidth is determined by the equation: relative bandwidth [%]=(bandwidth [GHz]/center frequency [GHz]) 100. The chip antennas 40 for 0.24 GHz and 0.82 GHz are prepared by adjusting the turn numbers and length of the conductor 42.

TABLE 4

| Material No. | Relative Bandwidth 0.24 GHz | Relative Bandwidth 0.82 GHz |
|---|---|---|
| 1 | Not measurable | Not measurable |
| 2 | 1.1 | 1.0 |
| 3 | 1.7 | 1.5 |
| 4 | 2.4 | 2.3 |
| 5 | 2.9 | 2.7 |
| 6 | 3.1 | 3.0 |
| 7 | 3.5 | 3.3 |
| 8 | 3.8 | 3.4 |
| 9 | 4.1 | 3.7 |
| 10 | 4.5 | 4.3 |
| 11 | Not measurable | Not measurable |
| 12 | 2.5 | 2.4 |

TABLE 4-continued

| | Relative Bandwidth | |
|---|---|---|
| Material No. | 0.24 GHz | 0.82 GHz |
| 13 | 3.0 | 2.7 |
| 14 | 3.2 | 3.0 |

Each material No. in Table 4 is identical to that in Tables 1 and 2. In Table 4, Not Measurable means a relative bandwidth of 0.5 [%] or less, or a too small resonance to measure.

Results in Table 4 demonstrate that chip antennas using a material having a dielectric constant of 130 (No. 1 in Table 1) and a material having a relative permeability of 7 (No. 11 in Table 2) do not exhibit antenna characteristics, as shown as "Not Measurable". On the other hand, when the dielectric constant is 1 or the relative permeability is 1, no compact chip antenna is achieved by the wavelength shortening effect due to the same value as the air. Thus, suitable materials have a dielectric constant $\epsilon$ of $1<\epsilon<130$, or a relative permeability $\mu$ of $1<\mu<7$.

In the embodiment of the chip antenna 40, set forth above, several materials are used as examples, but the chip antenna is not limited thereto.

Further, although the embodiment of the chip antenna 40 set forth above illustrates an antenna having one conductor, two or more conductors may be available.

Moreover, although the embodiment of the chip antenna 40 set forth above illustrates a conductor formed inside the base member, the conductor may be formed by coiling the conductive patterns on the surface of the base member and/or inside the base member. Alternatively, a conductor may be formed by forming a spiral groove on the surface of the base member and coiling a wire material, such as a plated wire or enamelled wire, along the groove, or a conductor may be meanderingly formed on the surface of the base member and/or inside the base member.

The feeding terminal is essential for the practice of the chip antenna 40.

Although the present invention has been described in relation to particular embodiments thereof, many other variations and modifications and other uses will become apparent to those skilled in the art. Therefore, the present invention is not limited by the specific disclosure herein.

What is claimed is:

1. A mobile communication apparatus comprising:

an apparatus body and a chip antenna in said apparatus body, said chip antenna having:

a first generally planar sheet having a plurality of spaced, first conductors formed on one major surface thereof;

a second generally planar sheet having a plurality of spaced second conductors formed on one major surface thereof;

at least one generally planar additional sheet located between said first and second generally planar sheets;

said first, second and at least one generally planar additional sheet being laminated together to form an elongated structure wherein respective pairs of first and second conductors are coupled to one another through said at least one generally planar additional sheet to form respective spiral loops of a spiral antenna so that a central axis of said spiral antenna extends generally parallel to a longitudinal direction of said elongated structure;

each of said sheets being formed of a material having a permeability of $1<\mu<7$; and a feeding terminal coupled to one end of said spiral antenna so that said chip antenna forms a mono-pole antenna;

wherein said chip antenna is disposed at a place in said apparatus body where electromagnetic signals transmitted and received by said chip antenna, during use, are not significantly adversely affected by a user's body.

2. A mobile communication apparatus according to claim 1, wherein said chip antenna is disposed at a lower part of said apparatus body during use.

3. A mobile communication apparatus according to claim 2, wherein said apparatus body comprises a cover which is extendable away from a main part of the apparatus body during use, said chip antenna being disposed at said cover.

4. A method of manufacturing a mobile communication apparatus comprising the steps of:

providing an apparatus body and a chip antenna in said apparatus body, said chip antenna having:

a first generally planar sheet having a plurality of spaced, first conductors formed on one major surface thereof;

a second generally planar sheet having a plurality of spaced second conductors formed on one major surface thereof;

at least one generally planar additional sheet located between said first and second generally planar sheets;

said first, second and at least one generally planar additional sheet being laminated together to form an elongated structure wherein respective pairs of first and second conductors are coupled to one another through said at least one generally planar additional sheet to form respective spiral loops of a spiral antenna so that a central axis of said spiral antenna extends generally parallel to a longitudinal direction of said elongated structure;

each of said sheets being formed of a material having a permeability of $1<\mu<7$; and a feeding terminal coupled to one end of said spiral antenna so that said chip antenna forms a mono-pole antenna;

determining a place in said apparatus body where electromagnetic signals transmitted and received by said chip antenna, during use, are not significantly adversely affected by a user's body; and disposing said chip antenna at said place.

5. A method of manufacturing a mobile communication apparatus according to claim 4, wherein said chip antenna is disposed at a lower part of said apparatus body during use.

6. A method of manufacturing a mobile communication apparatus according to claim 5, further comprising the step of providing said apparatus body with a cover which is extendable away from a main part of the apparatus body during use, and disposing said chip antenna at said cover.

7. A mobile communication apparatus comprising:

an apparatus body having a transmitter and a receiver, and a chip antenna in said apparatus body, said chip antenna comprising:

a first generally planar sheet having a plurality of spaced, first conductors formed on one major surface thereof;

a second generally planar sheet having a plurality of spaced second conductors formed on one major surface thereof;

at least one generally planar additional sheet located between said first and second generally planar sheets;

said first, second and at least one generally planar additional sheet being laminated together to form an elongated structure wherein respective pairs of first and second conductors are coupled to one another through said at least one generally planar additional sheet to form respective spiral loops of a spiral antenna so that a central axis of said spiral antenna extends generally parallel to a longitudinal direction of said elongated structure;

each of said sheets being formed of a material having a permeability of $1<\mu<7$; and a feeding terminal coupled to one end of said spiral antenna so that said chip antenna forms a mono-pole antenna;

wherein said chip antenna is disposed at a place in said apparatus body such that a location of said chip antenna is closer to a location of said transmitter than to a location of said receiver.

8. A mobile communication apparatus according to claim 7, wherein said chip antenna is disposed at a lower part of said apparatus body during use.

9. A mobile communication apparatus according to claim 8, wherein said apparatus body comprises a cover which is extendable away from a main part of the apparatus body during use, said chip antenna being disposed at said cover.

10. A mobile communication apparatus comprising:

an apparatus body having a transmitter and a receiver, and a chip antenna in said apparatus body, said chip antenna comprising:

a first generally planar sheet having a plurality of spaced, first conductors formed on one major surface thereof;

a second generally planar sheet having a plurality of spaced second conductors formed on one major surface thereof;

at least one generally planar additional sheet located between said first and second generally planar sheets;

said first, second and at least one generally planar additional sheet being laminated together to form an elongated structure wherein respective pairs of first and second conductors are coupled to one another through said at least one generally planar additional sheet to form respective spiral loops of a spiral antenna so that a central axis of said spiral antenna extends generally parallel to a longitudinal direction of said elongated structure;

each of said sheets being formed of a material having a permeability of $1<\mu<7$; and a feeding terminal coupled to one end of said spiral antenna so that said chip antenna forms a mono-pole antenna;

wherein said chip antenna is disposed at a lower part of said apparatus body during use.

11. A mobile communication apparatus according to claim 10, wherein said apparatus body comprises a cover which is extendable away from a main part of the apparatus body during use, said chip antenna being disposed at said cover.

* * * * *